C. A. ROLFE.
ELECTRIC PROTECTIVE APPARATUS.
APPLICATION FILED APR. 20, 1903.
901,479.
Patented Oct. 20, 1908.
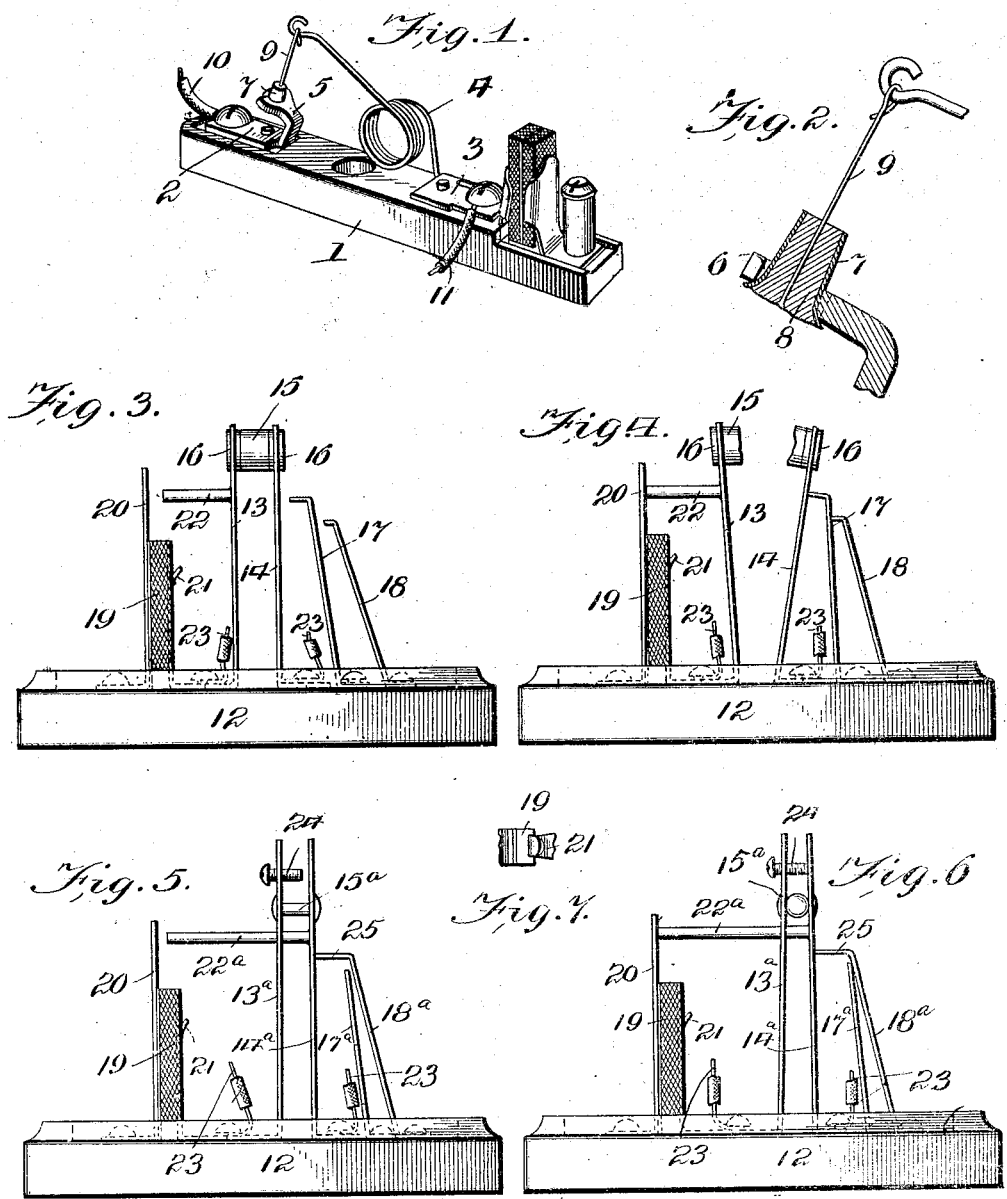

UNITED STATES PATENT OFFICE.

CHARLES A. ROLFE, OF ADRIAN, MICHIGAN, ASSIGNOR, BY MESNE ASSIGNMENTS, TO ROLFE ELECTRIC CO., OF ROCHESTER, NEW YORK, A CORPORATION OF NEW YORK.

ELECTRIC PROTECTIVE APPARATUS.

No. 901,479.   Specification of Letters Patent.   Patented Oct. 20, 1908.

Application filed April 20, 1903. Serial No. 153,398.

To all whom it may concern:

Be it known that I, CHARLES A. ROLFE, a citizen of the United States, residing at Adrian, in the county of Lenawee and State of Michigan, have invented a certain new and useful Improvement in Electrical Protective Apparatus, of which the following is a full, clear, concise, and exact description, reference being had to the accompanying drawings, forming a part of this specification.

My invention relates to electrical protective apparatus for protecting electrical circuits and instruments from the injurious effects of unduly strong currents.

Prominent objects of my present invention are, to reduce the expense of construction and maintenance of such devices; to secure simplicity of construction and operation; and to accomplish these results in a practical and effective manner.

In the protective apparatus herein set forth I employ a material which has the property of a conductor, but has such a high internal resistance as to generate heat upon the passage of a moderately strong current through it, and which is also made readily fusible or softenable by a moderate increase in temperature. This material I include in the circuit to be protected, and arrange in such shape or form and in connection with such devices, that during the passage of normal currents through the circuit the material will be unaffected and the circuit maintained in desired normal condition; but when such current becomes unduly strong, the material will generate heat by its own resistance, and will become fused or softened by such heat and thereby cause or permit the circuit to be controlled in any desired way, as for example opened or grounded, or both.

In the accompanying drawings, I have shown three different forms of protective devices operating in this manner. In each of these forms I desirably employ some spring means normally held in restraint by a suitable mass or quantity of such material, and arranged to operate to control the circuit in any desired manner when the material is heated and softened so as to release the spring means. It will be apparent that the material can be used in an infinite variety of ways and forms of protective devices, and hence it will be understood that those herein shown are merely illustrative of the manner of employing the same.

In the accompanying drawings, Figure 1 is a view of one form of protective device embodying my present invention; Fig. 2 is a view of details of construction of such device; Figs. 3 and 4 are views of another form of device, Fig. 3 showing the device in its normal or unoperated condition, and Fig. 4 showing the same after operation; Figs. 5 and 6 are similar views of another form of device; and Figs. 7 and 8 are views of details of construction of the device of Figs. 3 and 4.

Referring first to the device shown in Figs. 1 and 2, such device consists of a base 1 made of insulating material such as porcelain, slate or the like, and provided with terminals 2 and 3 to which the circuit wires are understood to be properly connected. A spring 4 is secured to the base 1 at the inner end of the terminal 3, and extends toward the terminal 2. The latter is provided with an upwardly extending arm 5 having a socket 6, and in this socket is fitted a shell 7 containing a quantity or mass 8 of material of the kind hereinbefore mentioned, namely, a conducting material having a sufficiently high internal resistance to generate heat, and capable of softening or fusing upon moderate increase of temperature. This material can be of any suitable or desired composition, capable of giving the results mentioned. I find a very desirable composition, however, to be a non-conducting softenable material, such as wax, resin or the like, combined with a powdered conductor such as powdered carbon, graphite, copper or the like. The relative proportions of the two parts,—that is of the non-conducting wax and powdered conductor,—can be varied so as to secure materials having different degrees of conductivity, or different specific resistances as may be required or desired to meet different conditions. The proportions may be so varied as to secure widely differing results. This composition can be conveniently made by melting a suitable quantity of the non-conducting material such as wax or similar substance, and then adding the powdered conducting material thereto in desired quantity while the wax is still hot, and then permitting the mixture to cool, care being taken that the mixture is homogeneous throughout.

A hook or rod 9 is embedded in the mass of material 8 and engages the free end of the spring 4. The circuit, it will be seen, is made from the circuit wires 10 and 11 through the spring 4, hook 9, mass of material 8, shell 7 and arm 5. Under normal conditions the device is in the condition shown in Fig. 1. When an unduly strong current traverses the circuit, however, it heats the mass of material 8 by reason of the internal resistance of the same and the heat thus generated causes this material to become fused or softened, thereby allowing the spring 4 to withdraw the hook 9, whereupon the spring 4 retracts and opens the circuit.

In the arrangement shown in Figs. 3 and 4, a base 12 is provided with a pair of spring posts 13 and 14, and these support a cylindric cartridge 15 having its ends provided with caps 16, 16 adapted to engage the upper ends of the posts 13 and 14. The main body of the cartridge 15 is material of the kind specified, and it serves to hold the posts 13 and 14 under restraint, as shown in Fig. 3. Local circuit contacts 17 and 18 are arranged on the base 12 at one side of the spring 14, and on the other side of the spring 13 is arranged a lightning arrester carbon 19. This latter is interposed between a ground contact 20 and a line contact 21. The spring post 13 is provided with a plug or arm 22 adapted to strike against the contact 20 when the spring 13 is released. The wires 23, 23, of the circuit under protection, are connected with the posts 13 and 14 at the bases thereof. A ground-wire is connected with the ground contact 20 and local circuit wires are connected with the contacts 17 and 18. Under normal conditions the device is in the position shown in Fig. 3. On the passage of an unduly strong current, however, the high resistance softenable conducting material in the cartridge 15, heats and then softens, thereby releasing the springs 13 and 14, the former of which springs out and strikes against the ground contact 20, thereby grounding one side of the circuit, and the other of which springs out and strikes against the contact 17, thereby forcing the same against the contact 18 and closing a local circuit which is arranged to operate in any desired or preferred manner.

The arrangement shown in Figs. 5 and 6 is similar to the arrangement shown in Figs. 3 and 4, except that the spring posts 13$^a$ and 14$^a$ are adapted to spring toward one another instead of away from one another as in the former arrangement. This tendency on the part of the springs to come together is opposed by a plug 15$^a$ of high resistance softenable conducting material, which when heated and softened by an unduly strong current, becomes compressed as shown in Fig. 6. The post 14$^a$ is provided with a long arm or rod 22$^a$ adapted to come in contact with the ground contact 20, and the post 13$^a$ is provided with a screw 24 forming a stop to limit the approaching movement of the springs 13$^a$ and 14$^a$. The local circuit contacts 17$^a$ and 18$^a$ are made, the former with a straight end and the latter with a long bent end 25. The device in an unoperated condition is shown in Fig. 5, and in operated condition in Fig. 6, in which latter figure it will be seen that the long arm or rod 22$^a$ has come into contact with the ground contact 20 and the spring 14$^a$ has come against the stop 24, while the local circuit contact 18$^a$ has sprung over against the other local circuit contact 17$^a$. In this arrangement it will be seen the circuit is grounded by the arm 22$^a$ coming against the ground contact 20, and is also short-circuited by the spring 14$^a$ meeting the stop 24.

It will be seen that the devices thus constructed are exceedingly simple, the number of parts being reduced to a minimum. Instead of employing two separate devices, one a softenable material and the other a heat concentrating device for acting upon the same, in accordance with the manner of construction of protectors now and heretofore in common use, I secure these results by a single material which has the combined properties of concentrating heat and of softening upon the development of a moderate extent of heat, and thus I dispense with one of the instrumentalities now commonly employed in protectors, and also simplify the protector by avoiding the necessity of providing proper connections and association of these two instrumentalities. It will also be seen that the device is cheapened as well as simplified, because the high resistance softenable conducting material can be made at very low expense, both the wax and the powdered conducting material being very cheap and easily obtainable; in fact much scrap or waste can be used for this purpose, as for example copper filings. It will be seen also that the expense of labor can be largely reduced, because the necessity of winding heat coils, of making connections, etc. etc. can be avoided and instead the material made in large quantity and formed or molded into desired shape in the simplest possible methods.

In the three arrangements above set forth, it will be seen that I have shown simple and practical devices for opening the circuit, for opening and grounding the same, and for short-circuiting and grounding the same, respectively. It will be readily seen that many other and varied devices can be devised for accomplishing these results and other results. It will be well understood, therefore, that I do not intend to limit myself to the particular form of devices herein set forth, nor to the construction which they possess.

What I claim as my invention is:—

In a device of the class specified, a non-conducting softenable material, comprising wax, rosin, and a powdered conductor, in combination with circuit controlling spring actuated devices, held normally in position by said softenable material, and released when an unduly strong current softens said material.

In witness whereof, I hereunto subscribe my name this 27th day of January A. D., 1903.

CHARLES A. ROLFE.

Witnesses:
A. MILLER BELFIELD,
I. C. LEE.